L. G. PULTZ.
TEA KETTLE.
APPLICATION FILED JUNE 21, 1916.
1,262,699.
Patented Apr. 16, 1918.
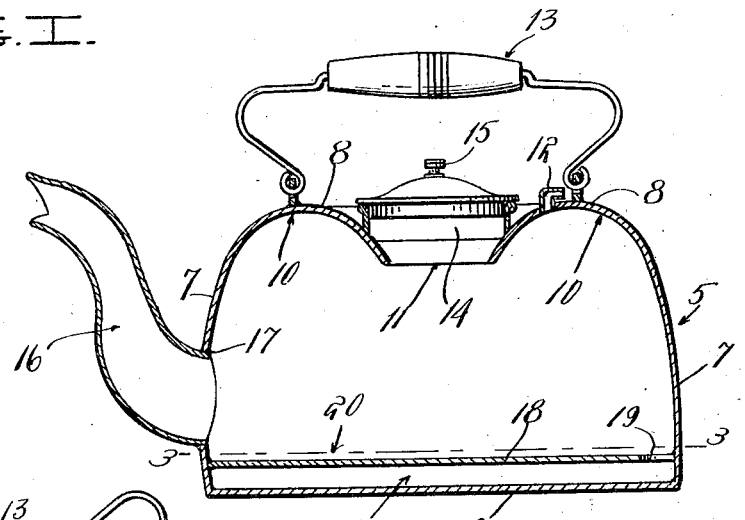
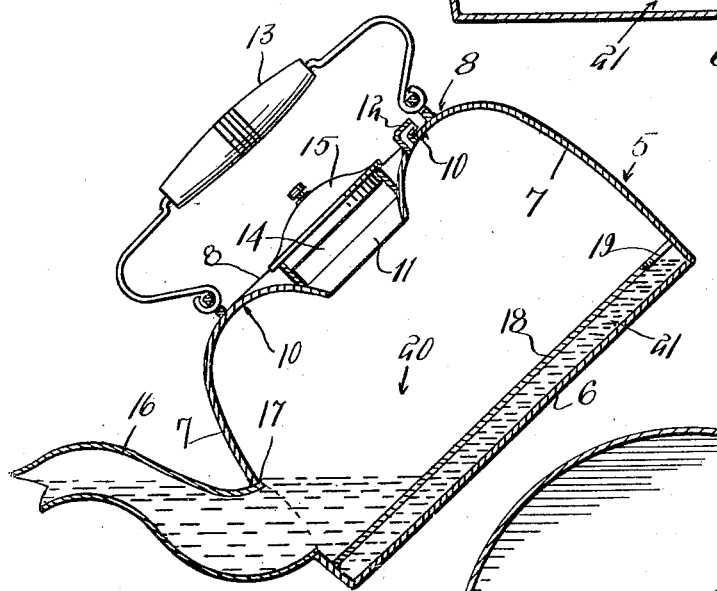
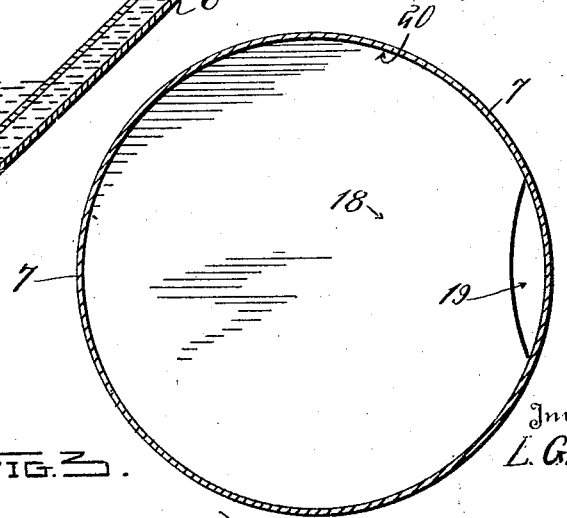
Inventor
L. G. Pultz.
Witness
By
Attorneys

UNITED STATES PATENT OFFICE.

LEE G. PULTZ, OF RED HOOK, NEW YORK.

TEA-KETTLE.

1,262,699. Specification of Letters Patent. Patented Apr. 16, 1918.

Application filed June 21, 1916. Serial No. 104,935.

*To all whom it may concern:*

Be it known that I, LEE G. PULTZ, a citizen of the United States, residing at Red Hook, in the county of Dutchess, State of New York, have invented certain new and useful Improvements in Tea-Kettles; and I do hereby declare the following to be a full, clear, and exact description of the invention, such as will enable others skilled in the art to which it appertains to make and use the same.

This invention relates to improvements in culinary vessels and is directed more particularly to a tea kettle of improved and novel construction.

An object of the present invention resides in the provision of a tea kettle which embodies in its construction means whereby "boiling over" of the kettle will be effectively prevented.

A further object of the invention is to provide means so arranged within the kettle as to prevent its contents being entirely dispensed under usual pouring conditions, there being left sufficient liquid to cover the bottom of the kettle so that the same may not be burnt should it be replaced over the fire and neglected for any length of time, the structure, however, being such as will permit of the entire contents to be poured out through the spout when conditions dictate.

With the above and other objects of similar nature in view, the invention consists in the construction, combination, and arrangement of parts, set forth in and falling within the scope of the appended claim.

In the drawing:—

Figure 1 is a vertical sectional view of a kettle constructed in accordance with the invention;

Fig. 2 is a similar view thereof in pouring position, illustrating the manner in which a certain quantity of liquid is retained therein after the water has been dispensed; and Fig. 3 is a transverse section taken on the line 3—3 of Fig. 1.

Referring now more particularly to the accompanying drawing the utensil is designated generally at 5 and comprises a hollow body including a bottom wall 6 and side walls 7. The top 8 of the body is produced by introverting the side walls 7, thereby providing a substantially semicircular downwardly opening annular channel 10 and a constricted filling opening 11.

By this construction, "boiling over" of the contents of the kettle will be effectively prevented, the curved walls of the top serving to deflect the water downwardly and centrally and thereby counteract the normal tendency of the water to bubble upwardly through the filling opening. A vent 12 is also provided in the top 8 to permit escape of steam from the vessel the outer end of the vent being bent horizontally to direct the steam away from the handle 13, usually found in vessels of this nature, and thereby obviate burning of the hand when lifting the vessel. The neck of the kettle is indicated at 14 and is of a diameter greater than the filling opening 11 and suitably secured to the top 8, a cover 15 being employed for closing the neck.

A pouring spout 16 is carried by the side of the vessel and communicates with the interior thereof through an opening 17 formed in the wall 7.

In order to prevent dispensation of the entire contents of the vessel through the spout 16, there is provided therein in spaced parallel relation to the bottom 6, a supplemental bottom 18, said supplemental bottom being disposed in a plane below the opening 17 and having an aperture 19 formed therein adjacent its juncture with the side wall 7 and at the opposite side of the vessel from the spout 17. The vessel is thus divided by the supplemental bottom into upper and lower compartments 20 and 21 respectively the upper compartment being disposed in direct communication with the pouring spout while communication between said compartments is established by the aperture 19 in the supplemental bottom.

Thus when the vessel is tilted, the water in the upper compartment will flow outwardly through the spout 16 while the water in the lower compartment will remain therein owing to the position of the aperture 19 with respect to the spout. It is thus obvious that the contents of the vessel will not be entirely dispensed through the spout, there remaining a sufficient quantity in the lower compartment to cover the bottom 6 and prevent burning thereof should the vessel be replaced over the fire and neglected for any length of time. It will be further obvious that by tilting the kettle on its rearmost point and then rolling it on its bottom edge, the entire contents may be caused to pass over the supplemental bottom 18 and may be then poured from the spout.

What is claimed is:—

A kettle having a pouring spout at one side and having a false bottom, the spaces above and below the false bottom communicating only by a single opening positioned diametrically opposite the pouring spout and adjacent the wall of the kettle.

In testimony whereof, I affix my signature, in the presence of two witnesses.

LEE G. PULTZ.

Witnesses:
FRANK G. SHAFFER,
M. E. PULTZ.

Copies of this patent may be obtained for five cents each, by addressing the "Commissioner of Patents, Washington, D. C."